United States Patent [19]
Gardner et al.

[11] 3,874,696
[45] Apr. 1, 1975

[54] SUPPORT FOR SEMI-TRAILERS
[75] Inventors: Clifford C. Gardner, Albuquerque, N. Mex.; Ralph A. Olson, Broomfield, Colo.
[73] Assignee: Timpte, Inc., Denver, Colo.
[22] Filed: Jan. 2, 1973
[21] Appl. No.: 320,490

[52] U.S. Cl............ 280/150.5, 248/188.6, 280/427, 280/475
[51] Int. Cl. ................................................ B60s 9/04
[58] Field of Search............ 280/150.5, 475, 414 A, 280/427, 429, 431; 248/240.4, 240, 242, 188.6

[56] References Cited
UNITED STATES PATENTS

| | | | |
|---|---|---|---|
| 255,781 | 4/1882 | Graeser........................... | 280/150.5 |
| 1,774,894 | 9/1930 | Land.............................. | 280/429 X |
| 2,232,754 | 2/1941 | Winn............................. | 280/427 X |
| 2,580,545 | 1/1952 | Hill................................ | 280/475 X |
| 3,169,012 | 2/1965 | Fagan........................... | 280/150.5 X |
| 3,177,664 | 4/1965 | Konkle.......................... | 280/150.5 X |
| 3,526,414 | 9/1970 | Palen............................ | 280/150.5 |
| 3,536,337 | 10/1970 | Molnar.......................... | 280/150.5 |

FOREIGN PATENTS OR APPLICATIONS

| | | | |
|---|---|---|---|
| 1,100,833 | 9/1955 | France........................... | 280/150.5 |

*Primary Examiner*—David Schonberg
*Assistant Examiner*—Michael J. Forman
*Attorney, Agent, or Firm*—Horace B. Van Valkenburgh; Frank C. Lowe

[57] ABSTRACT

A support for the front end of a semi-trailer adapted to be connected to and disconnected from a tractor includes a pair of spaced, tubular legs having adjustable lower ends and a spaced pair of pins which extend laterally to each side to engage slots in depending plates of a slide. The piston rod of an air cylinder is connected to a beam connected between the legs, while a pair of longitudinal guides are mounted on the underside of the trailer and each has a central, rectangular tube between the slide plates of the respective slide and angular flanges to engage slide bars on the outside of the slide plates. The configuration of the slots is such that when the legs and slides are moved rearwardly from a front position, the legs will pivot upwardly and rearwardly, and when the legs and slides are moved forwardly from a rear position, the legs will pivot downwardly and slightly forwardly but will be suspended from the slides until the tractor is pulled out from under the front end of the trailer.

Air to the cylinder is conveniently supplied from a tank connected by a non-return valve with either the brake air line or the emergency brake air line, while a control valve is operated by the pressure in the emergency brake air line. When the emergency gland hands are connected, as the tractor is hooked up, this valve will cause the piston rod to be retracted by air from the tank supplied to the front end of the cylinder, but when the emergency glad hands are disconnected and pressure is reduced, the valve will cause the piston rod to be extended by air from the tank supplied to the rear end of the cylinder. The valve also causes the opposite end of the cylinder to be exhausted whenever air pressure is supplied to one end. An air brake exhaust valve may be used to produce a more rapid rate of exhaust and a faster action of the piston rod. The operation of the support thus automatically ensues from normal procedure in connecting and disconnecting the tractor.

5 Claims, 14 Drawing Figures

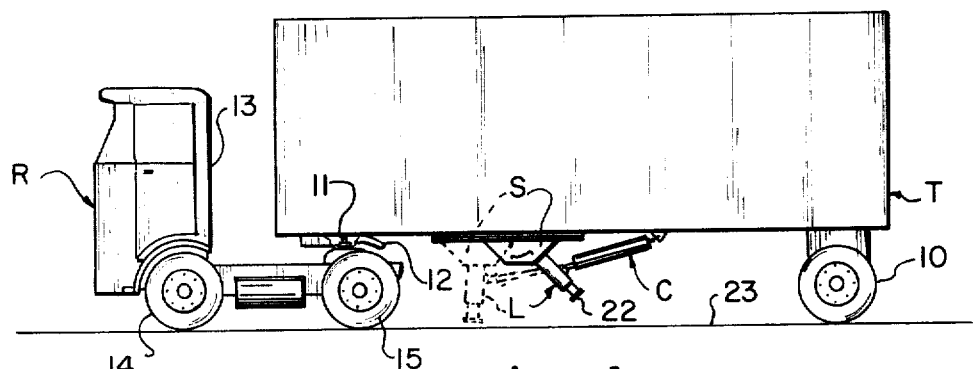
Fig_1
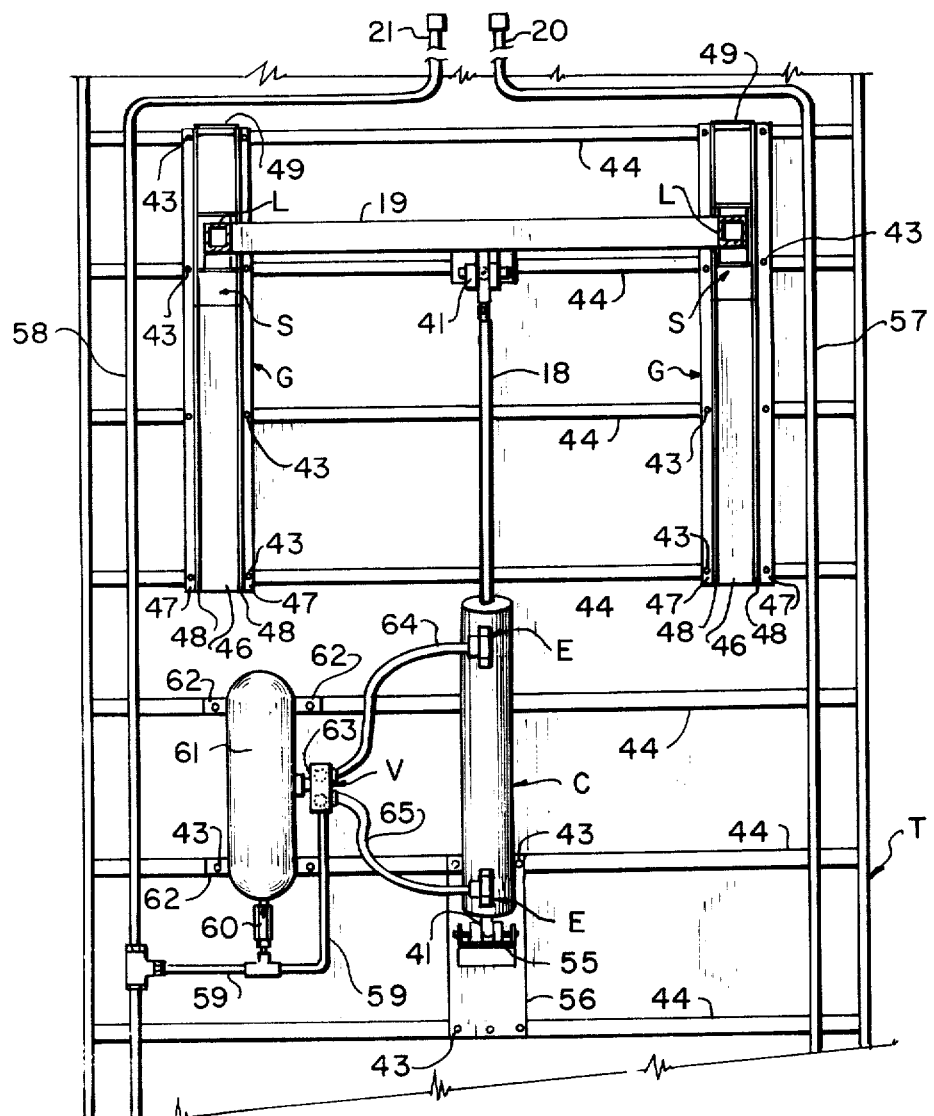
Fig_2

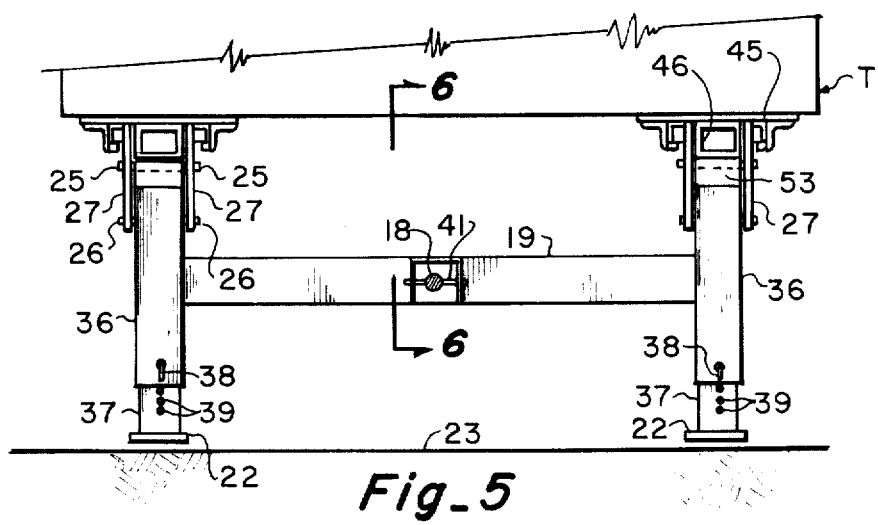
Fig_5
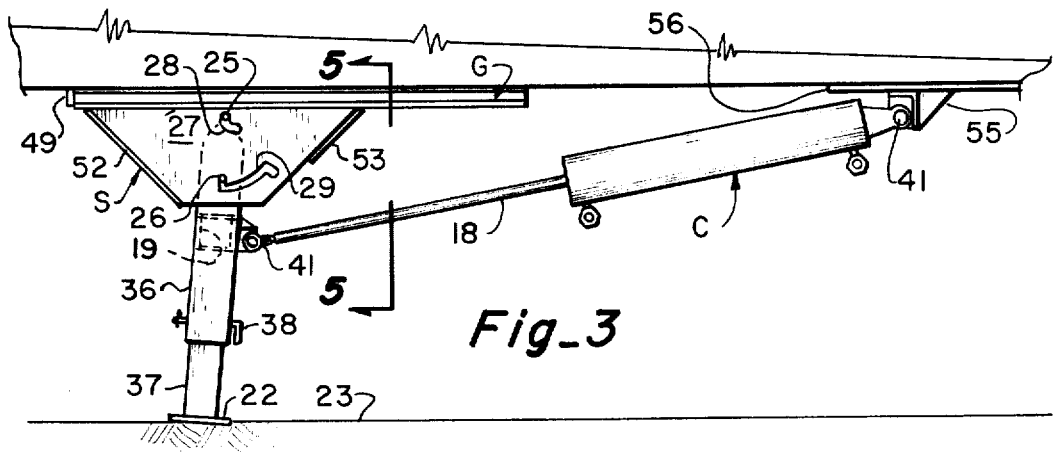
Fig_3
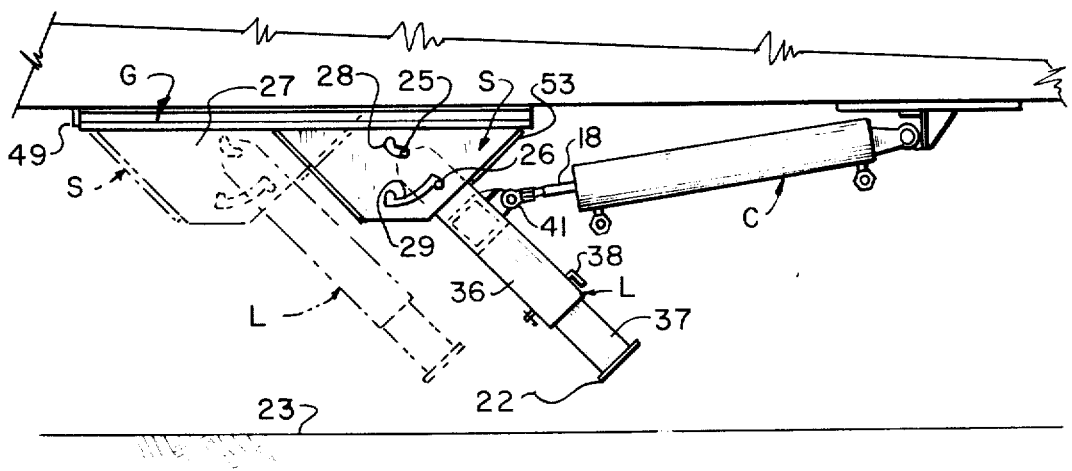
Fig_4

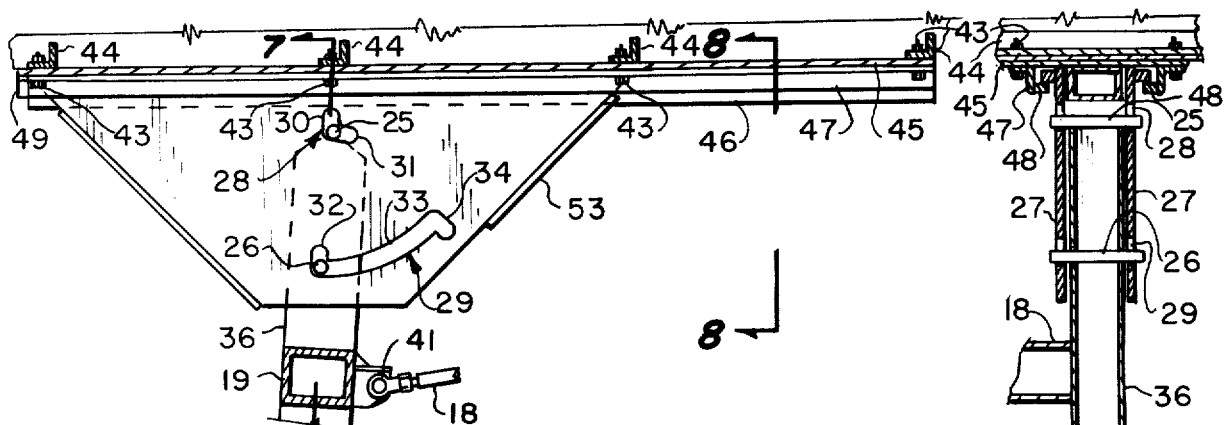
Fig_6    Fig_7
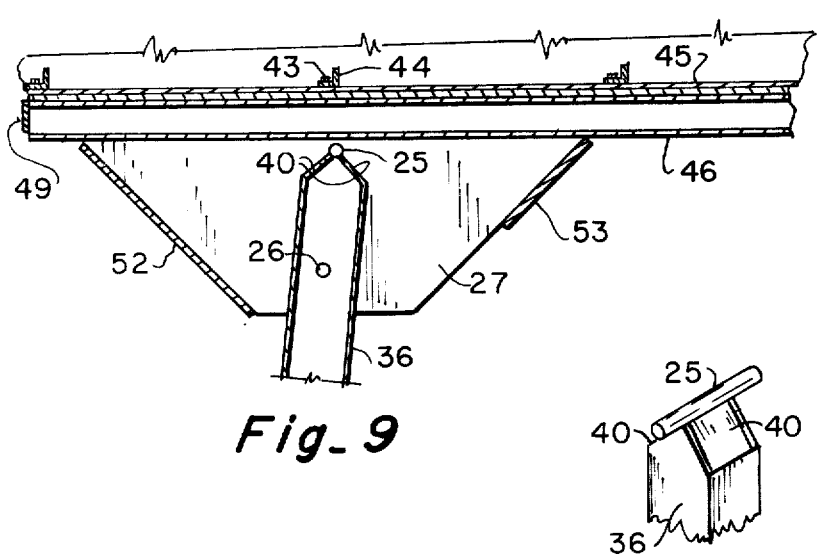
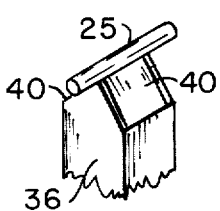
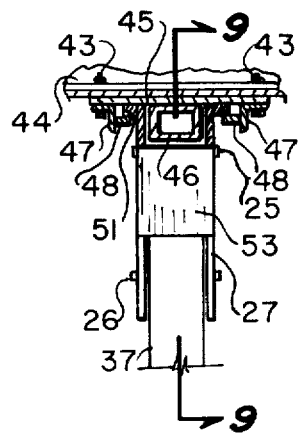
Fig_9    Fig_10    Fig_8
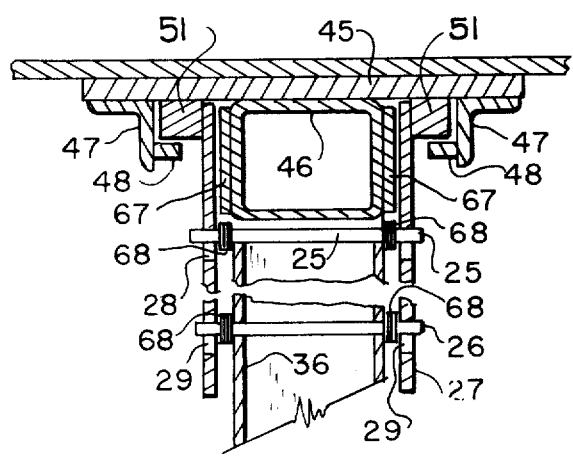
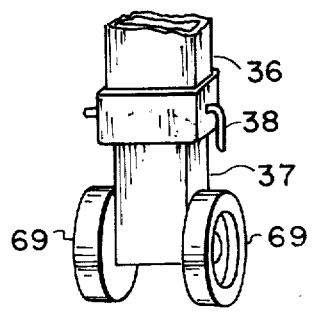
Fig_11    Fig_12

SUPPORT FOR SEMI-TRAILERS

This invention relates to supports for semi-trailers, such supports being leg members or pedestals for supporting the front end of a semi-trailer when the tractor is disconnected and driven away.

For many years, the conventional type of support has included a telescopic leg which has utilized a manually actuated crank for turning a threaded section of the leg, to extend and to lower the leg, or pedestal, downwardly to the ground prior to disconnecting and driving the tractor away. Such supports require considerable effort, as well as time, on the part of the driver, both in extending and also in retracting the support, when the tractor is driven under and connected to the semi-trailer. Various types of landing gear have been proposed which will operate mechanically or hydraulically, as by air pressure. One type provides laterally extensible and turnable legs which extend outwardly at each side of the trailer, but this type utilizes an undue amount of space, particularly when a series of trailers are parked side by side, as at a loading dock. Another type moves legs downwardly to support the trailer, and then it may retract to lower the front of the trailer to a so-called "kneeling" position. However, this kneeling type of support causes the trailer bed to slope downwardly toward the front, when in a kneeling position, making it difficult to load and unload, and also introduces the possibility of damage to goods therein. Another type, a fully automatic system, utilizes a special fifth wheel set-up on the tractor and a special connector on the semi-trailer which can be used only with each other. This arrangement adversely affects trade-in values and necessitates the patching of worn out equipment. In addition, with such a type of semi-trailer, air brakes are normally left dead or the mechanical brakes turn out to be unsafe.

A more recent development, known as a "hydraulic fifth", utilizes a tractor mounted fifth wheel which raises and lowers, and when connected, raises the front end of the trailer upwardly, so that the fixed front support legs will have adequate clearance above the ground. This eliminates the necessity of extending or retracting its front leg supports and thus saves the time and energy of hand cranking the support up or down. This type is useful for an in-plant or in-terminal shuttle, but for crosstown or interurban operation with the legs fully extended, a short trailer must be pulled with its nose high, and its body tipping rearwardly, with the possibility of roof damage, load shifting or freight falling off the rear end of the trailer. On the other hand, if the trailer is pulled with its body more nearly level, with the extended legs just clearing the ground, there is a possibility of damage to the supporting legs by ground obstructions.

A particular problem, which is inherent in operating relatively short semi-trailers generally 30 feet or under in length, is that such trailers have a tendency to nosedive forwardly over the support whenever the bulk of a load is at the front end of the semi-trailer. This will necessarily occur whenever the trailer is being loaded or unloaded, as when it is parked at a dock. It is necessary to build a semi-trailer with the supports located rearwardly of the fifth wheel connection a distance sufficient to permit clearance, and avoid contact damage, between the tractor tires and the supports. This clearance must exist not only when the tractor is in line with the semi-trailer, but particularly when the tractor is turning and angled with respect to the semi-trailer. The tendency of a semi-trailer to nosedive because the supports are located too far rearwardly of the front end constitutes a dangerous situation for personnel, as well as a situation where costly repairs become necessary. Thus, it is often necessary for the operator of a short semi-trailer to utilize an auxiliary nose prop or to utilize heavy, movable sawhorses of a suitable height, or to equip the trailer with a movable support. The latter will generally utilize a special crank which must be turned manually to actuate a rack and pinion for translating the entire support forwardly or rearwardly. This additional operation is also time consuming, in addition to the time consumed in manually raising and lowering the landing gear legs.

Among the objects of the present invention are to provide a novel and improved support for a semi-trailer; to provide such a support which is especially useful for short semi-trailers; to provide such a support which, when retracted, will be located rearwardly of the fifth wheel connection a distance sufficient to prevent damage by the turning tractor wheels, but when extended and supporting the semi-trailer, will be located forwardly and at a position where any tendency for nosediving is avoided; to provide such a support which may be air operated, as by the same air supply which operates the air brakes of the trailer; to provide such a support which may be automatic in operation, i.e. to be automatically retracted when the tractor is backed beneath the trailer and the air glad hands are hooked up, as well as to be automatically extended when the air to the trailer is shut off, just prior to moving the tractor out from under the trailer; to provide such a support which is comparatively simple in construction, but sufficiently sturdy to resist the impacts and loads imposed thereon; to provide such a support which will operate smoothly and effectively; to provide such a support which has the additional safety feature of being automatically extended, in the event that the tractor separates from the trailer and air to the brakes is lost, thus tending to support the trailer in an upright position; and to provide such a support which will be economical and effective in operation.

The foregoing and additional objects of this invention, as well as the novel features thereof, will become apparent from the description which follows, taken in conjunction with the accompanying drawings, in which:

FIG. 1 is a side elevation, on a reduced scale, of a tractor and a trailer having a support constructed in accordance with this invention, the support being shown in full lines in retracted position for travelling and in dotted lines in an extended but suspended position prior to withdrawal of the tractor;

FIG. 2 is a bottom plan view of a portion of the underside of the tractor, showing the support in extended position and particularly the air equipment for operating the same;

FIG. 3 is a side elevation of the extended support supporting the front end of the trailer, after withdrawal of the tractor;

FIG. 4 is a side elevation of the retracted support, similar to a portion of FIG. 1 but on an enlarged scale and showing in dotted lines an intermediate extended position;

FIG. 5 is a vertical section, corresponding to a section taken along line 5—5 of FIG. 4 but showing the support in suspended position, while the trailer is engaged by the tractor;

FIG. 6 is a fragmentary transverse section, on a slightly enlarged scale, and taken along line 6—6 of FIG. 5;

FIG. 7 is a section taken centrally of one of the legs of the support, along line 7—7 of FIG. 6;

FIG. 8 is a section taken along line 8—8 of FIG. 6, looking toward a slide of the support;

FIG. 9 is a longitudinal section taken centrally of the slide, along line 9—9 of FIG. 8;

FIG. 10 is a perspective view of the upper end of one of the legs of the support;

FIG. 11 is a section similar to the upper portion of FIG. 7 but on an enlarged scale and showing an alternative construction;

FIG. 12 is a perspective view of the lower end of a leg showing an alternative construction;

Figure 13:
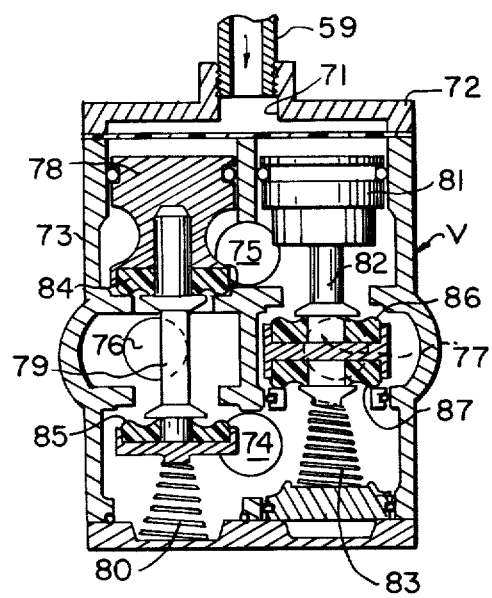
FIG. 13 is a cross section of an air control valve.

As illustrated in FIG. 1, a semi-trailer support constructed in accordance with this invention may be mounted on the underside of a semi-trailer T having rear wheels 10 and a dependent kingpin 11 at the front. For travel, the front end of the trailer is supported by a tractor R having a fifth wheel 12 which interlocks with the kingpin 11 in a conventional manner, to permit the tractor to turn relative to the trailer. The tractor R is conventionally provided with a cab 13, turnable front wheels 14 and rear wheels 15 which are driven through a conventional transmission (not shown), actuated by an engine (not shown), conventionally mounted in the lower portion of the cab. The tractor R may, of course, be provided with tandem rear wheels, as is normally conventional for tractors used for pulling large trailers. In general, the support of this invention includes a pair of legs L, shown also in FIG. 5, each of which is separately mounted in a slide S in a manner described later and with each leg being movable forwardly and rearwardly along a guide G which is attached to the underside of the trailer. The support is actuated by air supplied or exhausted from the opposite ends of an air cylinder C while piston rod 18 extends from a double acting piston inside the cylinder, conventional and therefore not shown, with the outer end of the piston rod being connected to a beam 19, as in FIGS. 2 and 5, which extends between the legs L.

In general, the support is retracted to the full position of FIGS. 1 and 4, when the piston rod 18 is retracted into the air cylinder C, with the legs L in the angular position shown, and the slides S moved rearwardly to the rear end of the guides G. When the driver is ready to move the tractor out from under the trailer, after the trailer is parked at the desired location, the air supply from the tractor to the service glad hand 20 and emergency glad hand 21 of FIG. 2 is shut off by the driver by disconnecting the air lines from the glad hands 20 and 21. This automatically causes, as in a manner described later, air under pressure to be supplied to the rear end of the cylinder C and causes the cylinder first to move each slide S and the corresponding leg L with it, forwardly to the dotted position of FIG. 4. When the slides S reach the end of their travel along guides G, further urging of the legs by the piston rod 18 will move the legs downwardly to the dotted position of FIG. 1, in which a disc or pad 22 at the base of each leg has a normal clearance of approximately 1 inch above the ground level 23. The support is then in position to receive the weight of the front end of the trailer, when the tractor is driven out from under it. As the tractor is driven out from under the front end of the trailer, the front end of the trailer will move downwardly for approximately 1 inch until the disc or pad 22 at the bottom of each leg engages the ground. Of course, the trailer brakes will be automatically set in the usual manner, when the air supply from the tractor to the glad hands 20 and 21 is discontinued.

When the tractor is next connected to the trailer, the fifth wheel 12 sliding underneath the front edge of the trailer will elevate the trailer until the legs L clear the ground, as in the dotted position of FIG. 1 and the full position of FIG. 5. Then, when air is again supplied by the tractor at the emergency glad hand 21, air will be automatically supplied to the front end of the cylinder C and exhausted from the rear end of the cylinder, in a manner described later, so that the piston rod 18 will be moved into the cylinder. The piston rod will first cause the legs to pivot to the dotted position of FIG. 4 and then cause the slides S and the legs L along with them to move rearwardly to the full position of FIGS. 1 and 4. In this position, the clearance between the lower edge of the discs or pads 22 and the ground 23 will be on the order of 10 to 14 inches, which is sufficient clearance for the legs to clear road obstructions.

As will be evident, when the slides S and legs L are in the forward or dotted position of FIG. 1, the legs of the support will be placed sufficiently forwardly of the trailer that any tendency of the parked trailer to nose-dive is overcome. Also, when the legs L and slides S are in the retracted or full position of FIGS. 1 and 4, there will be a sufficient distance between the rear wheels 15 of the tractor and the support that the tractor may be turned, even to a position at right angles to the trailer, without the wheels touching any part of the support.

In accordance with this invention, each of the legs L is provided, at each side, with a laterally extending upper pin 25 and also a laterally extending lower pin 26 spaced below the corresponding upper pin, but within the confines of the corresponding slide S. Each slide S includes a pair of depending parallel, inverted trapezoidal shaped plates 27 in which an upper slot 28 and a lower slot 29 are formed, as in the configuration shown in FIG. 6. Thus, the upper slot 28 may be provided with an upwardly extending portion 30, the centerline of which may extend upwardly and rearwardly at an appropriate angle, such as approximately 5° to the vertical, and a lower angular portion 31 which extends downwardly and rearwardly at an appropriate angle, such as approximately 48° to the vertical. The lower slot 29 may include a front portion 32 which extends upwardly from the front end of a central arcuate portion 33 thereof, with the centerline of front portion 32 being in alignment with the centerline of upper portion 30 of the upper slot, and the central arcuate portion of the lower slot being curved along a radius about the center of the intersection of the portions 30 and 31 of the upper slot. The lower slot also includes a rear portion 34 which extends downwardly, with its centerline at an appropriate angle, such as 48° to the vertical and in alignment with the lower portion of the upper slot. Each of the slots 28 and 29 and the various portions thereof correspond in width to the diameter of the pins 25 and 26, with a slight clearance to accommodate movement of the pins in the slots.

As will be evident, in the retracted position shown in full lines in FIG. 4, each upper pin 25 is disposed in the lower portion 31 of an upper slot, while each lower pin 26 is disposed in the rear portion 34 of a lower slot. These are the positions of the pins 25 and 26 when the legs L and slide S have been fully retracted. As the piston rod 18 starts its extension from cylinder C, its thrust is slightly downwardly and therefore will tend to maintain the legs L in the full position of FIG. 4, relative to the corresponding slide S, until each slide reaches its forward position along the corresponding guide G, shown in dotted lines in FIG. 4. Since each slide has reached the end of its guide G, additional thrust of piston rod 18 will move the legs forwardly and slightly upwardly, such movement being controlled by movement of the pins 25 and 26 in the slots, i.e. the lower pin 26 moving into the central arcuate portion 33 of lower slot 29 and the upper pin 25 moving to a position centrally of upper slot 28. Since the lower pin 26 is restrained against upward movement by the lower slot 29, further forward thrust of piston rod 18 will move the lower pin 26 along the arcuate central portion 33 of the lower slot until further movement is limited by pin 26 reaching the front end of the arcuate slot portion 33. At this time, the pins 26 will drop to the bottom of front portion 32 of lower slot 29 and pins 25 will assume a corresponding position in the upper slot. The result is that the legs L will be suspended from the trailer, as in the dotted position of FIG. 1, since the tractor has not yet been disconnected from the trailer and, in fact, actually supports the trailer. As indicated previously, the forward movement of the piston rod 18 has been produced by the disconnection of the emergency glad hand 21 of FIG. 2, so that as soon as the support is extended to the dotted position of FIG. 1, the tractor may then be driven out from under the front end of the trailer, and the front end of the trailer permitted to move downwardly, with the upper pin 25 moving into the upper end of upper slot 28 and the lower pin 26 moving upwardly into the upper end of the front portion 32 of the upper slot, i.e. to the position of FIG. 3. Thus, the front of the trailer will then be supported. It will be noted that the alignment of the forward and downward slant of the upper portion 30 of slot 28 and front portion 32 of slot 29 will cause the support legs to be slanted forwardly at the bottom, so that the pins 25 and 26 have no difficulty in moving upwardly to an appropriate position for supporting the front end of the trailer T.

When the tractor is again backed under the front end of the trailer, for connection to the trailer preparatory to moving the trailer to another location, the reverse positioning of the pins 25 and 26 in the various portions of the slots 28 and 29 will take place. Thus, as the front end of the trailer is lifted by the fifth wheel 12, the legs L will be lifted and the pins 25 and 26 will drop to the positions shown in FIG. 6. As indicated previously, when tractor air is connected to the emergency glad hand 21, piston rod 18 will be automatically retracted and the legs L will be moved first to the dotted position of FIG. 4, the slides S then retracted and as the slides reach the rearward end of their movement, the support will be held in that position by the air pressure still existing in the front end of cylinder C.

Each leg L, as in FIGS. 3–5, includes an upper tube 36, which may be essentially rectangular in cross section, and a lower tube 37 which has a similar cross section but with outside dimensions corresponding to the inside dimensions of the upper tube, so that the lower tube 37 may be adjusted to different positions within the upper tube, depending upon the height at which the trailer is to be supported. A suitable device may be utilized for obtaining such adjustment, such as the bolt 38 shown, adapted to be held in position by a cotter pin or the like and insertable through a pair of holes adjacent the lower end of the upper tube 36 and any one of several holes 39, shown in FIG. 5, in the lower tube 37. If desired, the upper and lower tubes may be formed as one piece, although adjustability of the legs permits the same support to be installed on a number of trailers having different bed heights.

The upper end of the upper tube 36 of each leg, as in FIGS. 9 and 10, may be bevelled in each direction at the top, as at 45°, with a metal cap 40 welded at each side to the upper end of the tube. The upper pin 25 is welded to the apex of the upper tube 36 between the caps 40, while the lower pin 26, as in FIG. 7, may extend completely through the upper tube and may be welded thereto at the edges of the holes through which the pin extends. The disc or pad 22, at the bottom of each leg, is welded to the underside of the lower tube 37. Beam 19 is welded, at each end, to the inside of each upper tube 36, while the front end of piston rod 18 is pivotally connected to beam 19, as by a conventional pivot connection 41.

Each guide G may be removably attached, as by bolts 43, of FIGS. 6, 7 and 8, which extend upwardly through holes drilled for that purpose, in the lower flange of transverse channels 44, which support the bed of the trailer. Each guide G may include an elongated plate 45 which is bolted, as indicated, or otherwise suitably attached to the underside of the truck bed. Attached centrally to the underside of plate 45, as by welding, is a central guide tube 46 which may be rectangular in cross section and corresponds in width to the distance between the plates 27 of the corresponding slide S. Also attached to the underside of plate 45, on opposite sides of and in spaced relation to the tube 46, are a pair of angles 47, or other suitable structural members, each for maintaining in position a slide bar 48 which extends along the inside of the depending flange of an angle 47 and in spaced relation to plate 45. Each bar 48 is attached, as by welding, to the corresponding angle. A stop 49, as in FIGS. 2, 3 and 9, may be welded across the front end of the angles 47, to prevent the corresponding slide S from moving forwardly off the corresponding guide. Since there is no load on the legs L when the support is retracted, a similar stop at the rear end of each guide G is less necessary, but may be provided, if desired.

In addition to the trapezoidal side plates 27, each slide S, as in FIGS. 7–9, may include a pair of slide bars 51 which are attached, as by welding, to the outside of each plate 27 and at or adjacent the upper edge thereof. The slide bars 51 are adapted to move along the bars 48 to support the weight of the legs L and beam 19, but if flush with the upper edges of plates 27, will engage the underside of plate 45 when the legs are supporting the forward end of the trailer, as in the dotted position of FIG. 1. The slides are also reinforced by a front gusset 52 and a rear gusset 53, as in FIGS. 3–6 and 9, which are attached, as by welding, across the front and rear edges, respectively, of side plates 27. Front gusset 52 extends downwardly from below the guide tube 46, to provide clearance for the movement of the slide, as in FIGS. 3 and 9, while gusset 53 extends from just below the guide tube 46 downwardly to a point which provides sufficient clearance for the legs L, when in the retracted position of FIG. 4.

The rear end of cylinder C, as in FIG. 2, is pivotally connected, by a pivot connection 41, to a bracket 55 which is mounted on the underside of a plate 56, in turn connected to appropriate channels 44 by bolts 43. The glad hand 20 is mounted on the forward end of a service pipe 57 which extends rearwardly to the trailer brakes in the customary manner, while the emergency glad hand 21 is mounted on the front end of a pipe 58 which extends rearwardly to the brakes in the customary manner, but is connected with a branch pipe 59, which in turn is connected through a non-return valve 60 with an air tank 61, which will store more than sufficient air to extend the landing gear several times, since the landing gear is extended after the air supply from the tractor to the emergency pipe 58 is cut off. Air tank 61 is mounted on the underside of the trailer by brackets 62, in turn attached by bolts 43 to appropriate channels 44. Branch air pipe 59 also leads to the control inlet of an air control valve V which has an inlet port connected to air tank 61 by a pipe 63, an exhaust port and two control ports connected by hoses 64 and 65 to the front and rear ends of cylinder C, respectively. Each of the hoses 64 and 65 is connected to the cylinder C through a special exhaust valve E, which will be referred to later, but which, in general, will open a sufficiently large exhaust port, when the air in the respective hose 64 or 65 is exhausted through the exhaust port of control valve V, so that the air within cylinder C will be much more quickly exhausted through the exhaust valve E.

The control valve V should be of a type which will cause air to be supplied from its inlet port to air hose 64 and thence to the front end of cylinder C, when air pressure is supplied through emergency air pipe 58, i.e. when the tractor is hooked up to the trailer and the brake lines are energized with air. Valve V is also constructed to cause air under pressure to be supplied through hose 65 to the rear end of cylinder C, when the air supply to emergency pipe 58 is shut off. Of course, when valve V causes air to be supplied through either hose 64 or 65, it will automatically cause the opposite hose to be exhausted through its exhaust port. A suitable type of control valve V, illustrated in FIG. 13, is described below.

In the alternative construction of the slide S, illustrated in FIG. 11, the longitudinal tube 46 is provided on each side with a wear plate 67 which extends the length of the tube and may be formed of a steel having a greater resistance to wear than tube 46. For such a construction, the pins 25 and 26 of the legs may be provided with spacers 68, such as washers, between the sides of the leg and the respective side plates 37. The spacers 68 tend to maintain the legs in vertical alignment with the side plates, as well as reducing friction between the sides of the legs and the insides of the plates 37.

In the alternative leg construction illustrated in FIG. 12, a lower tube 37' of each leg is provided with a caster wheel set 69 attached thereto in a conventional manner, rather than the disc or pad shown for the embodiment previously described. The lower tube 37' is shorter than the lower tube 37 of the previously described legs, but is again provided with adjustment holes 39. The casters 69 are particularly useful on rough or uneven ground.

The control valve V illustrated in FIG. 13 is similar to the single air four-way inline valves manufactured and sold by the C. A. Norgren Company of Littleton, Colorado, such as No. F1024B00-A1, although any model of the F101, F102 or F103 series may be utilized, depending upon the size of the branch line 59 and the cylinder hoses or tubes 64 and 65. The valve V includes an inlet port 71, to which the air branch line 59 is connected, and which is formed in a cap 72 closing one end of a housing 73. The housing 73 is provided with an inlet port 74, which, in use, will be connected to the pipe 63 of FIG. 2, and an exhaust port 75, which is left open and may be protected by a screen or the like, to prevent the entrance of small rocks or debris. The housing 73 is further provided with a first discharge port 76, to which hose 64 will be connected in use, and a second discharge port 77, to which hose 65 will be connected in use.

A first piston 78 having a stem 79 and urged toward the control air inlet by a spring 80 and a second piston 81 having a stem 82 and urged by a spring 83 toward the control air inlet are also provided. As shown in FIG. 13, both piston 78 and piston 81 have been moved against the pressure of the respective springs 80 and 83 to what may be termed a "pressure position" in which a poppet seal 84 of piston 78 is closed against its seat, but a poppet seal 85 is moved to an open position spaced from its seat, thereby permitting flow from inlet port 74 to hose port 76, as indicated by the arrow adjacent stem 79, but preventing any flow from port 76 to exhaust port 75. Similarly, piston 81 has been shifted to move a poppet seal 86 away from its seat and move a poppet seal 87 into engagement with its seat, thereby preventing flow from pressure inlet port 74 to port 77, but permitting flow from port 77 to exhaust port 75, as indicated by the arrow adjacent stem 82. It will be noted that, when the air pressure in branch pipe 59 is released, the springs 80 and 83 will move the respective pistons 78 and 81 to their opposite positions, in which poppet seal 84 will be spaced from its seat and poppet seal 85 will engage its seat, while poppet seal 87 will be moved from its seat and poppet seal 86 will engage its seat. In this latter position of the pistons and poppet seals, the flow will be reversed, i.e. pressure will be supplied from inlet port 74 to hose port 77, and air will flow from hose port 76 through exhaust port 75. As will be evident, in the position of the pistons 78 and 81 shown, air under pressure will be supplied to the front end of cylinder C and will be exhausted from the rear end of the cylinder to retract the landing gear, i.e. when the tractor is connected to the trailer and air brake pressure is supplied through the glad hand 21 to the emergency line 58.

Similarly, when the brake air supplied to the trailer is disconnected, just prior to moving the tractor out from under the trailer, the reverse positions of the pistons 78 and 81 will occur, so that air will be supplied through port 77 and hose 65 to the rear end of the cylinder C, and the front end of cylinder C will start to be exhausted through hose 65 and port 74, so that the piston rod 18 will be moved forwardly to extend the support to the dotted position of FIG. 1, where the support will become operative for the trailer, when the tractor is pulled away.

Figure 14:
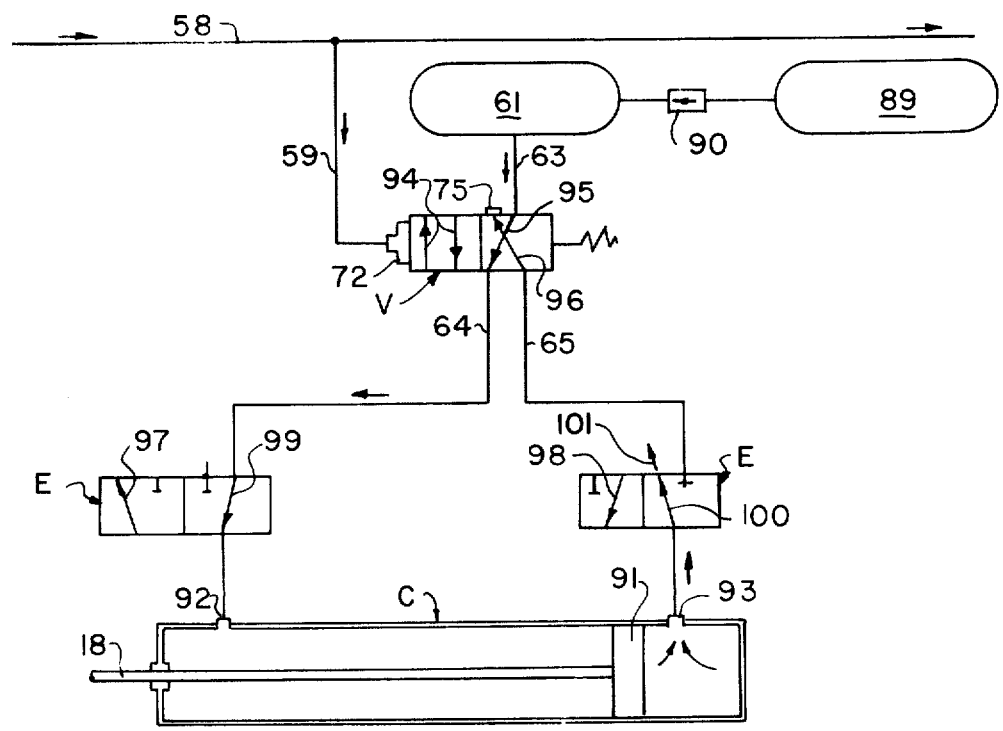
FIG. 14 is an air supply and control diagram illustrating one manner in which the retraction and extension of the support may be made substantially automatic upon normal operation of the tractor.

In the diagram of FIG. 14, the air tank 61 for the support is supplied in an alternative manner, i.e. instead of from the branch line 59 through non-return valve 60 of FIG. 2, from the normal air brake emergency tank 89, through a combination non-return and pressure regulating valve 90, which may be set to limit the pressure in tank 61, such as to 65 pounds per square inch. Otherwise, the parts shown in the diagram of FIG. 14 operate in the manner previously described, with the control valve V and the exhaust valves E being shown diagrammatically. The piston 91 of the cylinder C is also shown, as well as the ports 92 and 93 at the front and rear ends respectively, of the cylinder. The diagram of valve V indicates that the pistons therein are spring urged, while the arrows 94 indicate that the air pressure in branch pipe 59 has been substantially exhausted. If the air control pressure were present in pipe 59, arrows 94 would be crossed toward opposite sides of the valve diagram. The arrow 95 indicates that air under pressure is being supplied from tank 61 through hose 64 to the exhaust valve E connected to port 92 of cylinder C, while the arrow 96 indicates that the port connected to hose 65 is, in turn, connected to the exhaust port 75 of the control valve.

Each exhaust valve E is indicated diagrammatically, with arrow 97 indicating that air pressure is supplied to the exhaust valve connected to cylinder port 92, and arrow 98 indicating that pressure is not supplied to the exhaust valve connected to port 93, while arrow 99 indicates that air under pressure is being supplied to port 92 of cylinder C and arrow 100 indicates that port 93 of cylinder C is being exhausted to atmosphere through the exhaust orifice of exhaust valve E, as indicated by the arrow 101. Each exhaust valve E may be of any suitable type which will perform the above functions, such as the type QR or type QR-1 Bendix-Westinghouse, a quick release valve, which is normally used in controlling air brakes of vehicles. This type of valve utilizes a diaphragm which seats against an inlet port, through spring pressure in the QR valve and resiliency of the diaphragm in the QR-1 valve, to expose an exhaust port, when so seated. However, when air under pressure is supplied to the inlet or brake valve port, the diaphragm is moved away from its aforesaid seat and instead closes the exhaust port. Both the four-way inline valve and the quick release valve of the types indicated have been found to be dependable in tractor and trailer air systems.

It will be evident that the control valve V may be a solenoid control valve, operated by a switch in the cab or other convenient location. However, this would involve installing an additional electrical circuit and a disconnect between the tractor and trailer, as well as requiring the driver to remember to turn such a switch on or off, as required. Thus, the automatically air operated embodiment has advantages over an electrically controlled embodiment.

Although a preferred embodiment of this invention and certain variations have been illustrated or described, it will be understood that other embodiments may exist and that various changes may be made, all without departing from the spirit and scope of this invention.

What is claimed is:

1. A support for a semi-trailer adapted to be connected to and disconnected from a tractor, the front end of said trailer being supported by said tractor when connected thereto and said support supporting the front end of said trailer when said tractor is disconnected, said support comprising:
   leg means for supporting the front end of said semi-trailer when said tractor is disconnected;
   slide means movable forwardly and rearwardly along the underside of said trailer;
   guide means for said slide means extending generally horizontally;
   means pivotally connecting the upper portions of said legs with said slide means, said legs being movable between a depending position in which said legs are adapted to support said trailer through said slide means and a rearwardly extending position in which said legs are inclined rearwardly so as to be elevated; and
   means for moving said leg means between said depending position and said rear position, said pivotal connection being constructed and arranged so that forward movement of said leg means will cause said leg means to move to said depending position and will also produce forward movement of said slide means, while rearward movement of said leg means will produce movement of said leg means to said rearwardly inclined position and also movement of said slide means to said rear position.

2. A support as defined in claim 1, wherein:
   said leg means comprise a pair of connected, laterally spaced legs;
   said slide means comprise a pair of laterally spaced slides having depending plate means provided with slot means;
   said legs are provided with pin means engageable with said slot means of said plate means of the corresponding slides; and
   said moving means is connected to the lateral connection between said legs.

3. A support for a semi-trailer adapted to be connected to and disconnected from a tractor, the front end of said trailer being supported by said tractor when connected thereto and said support supporting the front end of said trailer when said tractor is disconnected, said support comprising:
   a pair of legs for supporting the front end of said semi-trailer when said tractor is disconnected, each leg having a pair of pins spaced one above the other and extending laterally at each side of said leg;
   a longitudinally movable slide for connection to each leg and including a depending plate at each side of the upper end of each leg;
   each depending plate having an upper slot and a lower slot, with said slots being in lateral alignment;
   means for moving said legs and slides between forward and rear positions;
   each upper slot being arcuate and having an upwardly and slightly rearwardly extending front portion and a downwardly and rearwardly extending lower portion;
   each lower slot having a central arcuate portion, a front portion extending upwardly and slightly rearwardly from the front of said central portion and a rear portion extending downwardly and rearwardly from the rear of said central portion;

said central portion of said lower slot being curved along a radius from the intersection of said front and lower portions of said upper slot;

said front portion of said lower slot being in alignment with said front portion of said upper slot; and said rear portion of said lower slot being in alignment with the lower portion of said upper slot, whereby when said legs are moved rearwardly from the front position, said legs will be pivoted upwardly and rearwardly and said slides will be moved rearwardly through connection with said legs to said rear position, and also so that when said legs are moved forwardly from the rear position, said legs will be moved downwardly and forwardly and said slides will be moved forwardly to said front position.

4. A support as defined in claim 3, wherein:

each leg is hollow and generally rectangular in section and provided with an adjustable lower end and a beveled top;

said pin means comprises a pair of pins associated with each leg and spaced one above the other, with the lower pin extending laterally through the corresponding leg and the upper pin attached to the apex of the top of said leg;

a slide bar is attached to the outside of each depending side plate of each slide at the top thereof;

said guide for each slide has an upper plate attached to the underside of said trailer, a pair of spaced, depending, inwardly extending angular members along which said slide bars of said slides are movable for supporting said slide during movement, and a central guide tube attached to the underside of said upper plate and disposed between the side plates of the corresponding slide;

an extensible and retractable cylinder and piston rod means disposed rearwardly of and for moving said leg means and said slide means between said front and rear positions;

means for supplying fluid under pressure to opposite ends of said cylinder, including an air brake line of said trailer and a storage tank;

means for controlling the supply of fluid to said opposite ends of said cylinder, for retracting said piston rod means when said front end of said trailer is supported by said tractor and for extending said piston rod means when said tractor is to be driven out from under said trailer, includes a control valve operable by the pressure in said air brake line for causing air under pressure from said storage tank to be supplied to the rear end of said cylinder to extend said piston rod means and to exhaust from the front end of said cylinder, when the pressure in said air brake line is reduced to a lower predetermined value, and for causing air under pressure to be supplied to said front end and to exhaust from said rear end, thereby causing said piston rod means to be retracted, when the pressure in said air brake line reaches a higher predetermined value; and an exhaust valve is connected between said control valve and each respective end of said cylinder, each exhaust valve having an exhaust orifice adapted to be connected with the corresponding end of said cylinder when the air pressure at said exhaust valve is reduced to a predetermined value when such air is being exhausted from said exhaust valve by said control valve.

5. A support for a semi-trailer adapted to be connected to and disconnected from a tractor, the front end of said trailer being supported by said tractor when connected thereto and said support supporting the front end of said trailer when said tractor is disconnected, said support comprising:

leg means for supporting the front end of said semi-trailer when said tractor is disconnected;

slide means for said leg means for movement between a forward position and a rear position;

means for moving said leg means and slide means between said positions;

said slide means having depending plate means provided with slot means;

said legs being provided with pin means engageable with said slot means of said plate means of the corresponding slide;

each leg being hollow and generally rectangular in section and provided with an adjustable lower end and a beveled top; and said pin means comprising a pair of pins associated with each leg and spaced one above the other, with the lower pin extending laterally through the corresponding leg and the upper pin attached to the apex of the top of said leg.

* * * * *